US010960792B2

(12) United States Patent
Kim et al.

(10) Patent No.: US 10,960,792 B2
(45) Date of Patent: Mar. 30, 2021

(54) AUXILIARY SEAT STORAGE APPARATUS OF SEAT

(71) Applicants: Hyundai Motor Company, Seoul (KR); Kia Motors Corporation, Seoul (KR); DAE WON SAN UP CO., LTD, Gyeonggi-do (KR)

(72) Inventors: Eun Sue Kim, Gyeonggi-do (KR); Hong Heui Lee, Gyeonggi-do (KR); Seung Hyeok Chang, Gyeonggi-do (KR); Sun Ho Hur, Seoul (KR); Sang Yong Koo, Incheon (KR); Dong Hwi Kim, Gyeonggi-do (KR)

(73) Assignees: Hyundai Motor Company, Seoul (KR); Kia Motors Corporation, Seoul (KR); DAE WON SAN UP CO., LTD, Gyeonggi-do (KR)

( * ) Notice: Subject to any disclaimer, the term of this patent is extended or adjusted under 35 U.S.C. 154(b) by 0 days.

(21) Appl. No.: 16/668,201

(22) Filed: Oct. 30, 2019

(65) Prior Publication Data
US 2020/0406795 A1 Dec. 31, 2020

(30) Foreign Application Priority Data
Jun. 27, 2019 (KR) .......................... 10-2019-0076899

(51) Int. Cl.
*B60N 2/30* (2006.01)
(52) U.S. Cl.
CPC .......... *B60N 2/3081* (2013.01); *B60N 2/3011* (2013.01); *B60N 2/3093* (2013.01)

(58) Field of Classification Search
CPC .. B60N 2/3081; B60N 2/3086; B60N 2/3011; B60N 2/3093
See application file for complete search history.

(56) References Cited

U.S. PATENT DOCUMENTS

| | | | | |
|---|---|---|---|---|
| 816,537 | A * | 3/1906 | Curwen | B60N 2/3086 297/236 |
| 1,643,236 | A * | 9/1927 | Bell | B60N 2/3025 297/236 |
| 4,765,678 | A * | 8/1988 | Huang | A47C 13/005 297/236 |
| 6,811,200 | B2 * | 11/2004 | Shibata | B60N 2/01 296/64 |
| 7,077,474 | B2 * | 7/2006 | Satani | B60N 2/3034 297/112 |

(Continued)

FOREIGN PATENT DOCUMENTS

KR 20150019160 A 2/2015

*Primary Examiner* — Philip F Gabler
(74) *Attorney, Agent, or Firm* — Mintz Levin Cohn Ferris Glovsky and Popeo, P.C.; Peter F. Corless

(57) ABSTRACT

An auxiliary seat storage apparatus of a seat is disclosed. An auxiliary seat slides in a lower portion of a main seat in a state of being folded to be accommodated in the lower portion of the main seat such that convenience of a user and storability can be improved. Further, when the auxiliary seat is accommodated in the lower portion of the main seat, the auxiliary seat is moved forward so that a foot insertion space is secured to a rear side of the auxiliary seat in a state in which the auxiliary seat is accommodated in the lower portion of the main seat such that ease of access of a passenger sitting on a rear seat can be improved.

20 Claims, 16 Drawing Sheets

(56) References Cited

U.S. PATENT DOCUMENTS

| | | | | |
|---|---|---|---|---|
| 7,490,896 B2 * | 2/2009 | Smith | ............... | B60N 2/3011 |
| | | | | 297/188.04 |
| 7,578,551 B2 * | 8/2009 | Linero | ............... | A47C 1/122 |
| | | | | 297/107 |
| 8,313,146 B2 * | 11/2012 | Wagner | ............ | B60N 2/3031 |
| | | | | 297/378.1 |
| 8,393,677 B2 * | 3/2013 | Wieclawski | ......... | B60N 2/3088 |
| | | | | 297/236 |
| 8,708,410 B2 * | 4/2014 | Scott | ............... | B64D 11/0696 |
| | | | | 297/236 |
| 8,714,619 B2 * | 5/2014 | Lindley | ............ | B60N 2/3011 |
| | | | | 296/65.09 |
| 9,475,407 B2 * | 10/2016 | Byun | ............... | B60N 2/3059 |
| 9,908,445 B2 * | 3/2018 | Park | ............... | B60N 2/3011 |
| 10,245,982 B2 * | 4/2019 | Khalid | ............... | B60N 2/3025 |
| 2008/0185893 A1 * | 8/2008 | Behrens | ............ | B60N 2/3086 |
| | | | | 297/378.1 |

* cited by examiner

AUXILIARY SEAT STORAGE APPARATUS OF SEAT

CROSS REFERENCE TO RELATED APPLICATION

The present application claims under 35 U.S.C. § 119(a) the benefit of Korean Patent Application No. 10-2019-0076899 filed on Jun. 27, 2019, the entire contents of which are incorporated by reference herein.

BACKGROUND

(a) Technical Field

The present disclosure relates to an auxiliary seat storage apparatus of a seat, which is capable of folding an auxiliary seat to accommodate the auxiliary seat in a lower portion of a main seat.

(b) Description of the Related Art

In general, a seat of a vehicle is installed in the vehicle so as to support a body of a passenger to reduce fatigue due to vehicle driving and provide a comfortable ride. The seat includes a seat cushion which supports hips of the passenger, a seat back coupled to an upper rear portion of the seat cushion to be adjustable in angle, and a headrest which supports a head of the passenger.

In a recreational vehicle (RV) with a third-row seat, a second-row auxiliary seat should collectively perform a reclining operation in which an angle of the seat back is adjustable in a forward-backward direction, a folding and diving operation in which the seat back is pivoted in a forward direction to be completely folded, and a walk-in operation in which the second-row auxiliary seat is moved so as to allow a passenger on the third-row seat to get into and out of the RV.

When a passenger gets into and out of a vehicle toward and from the third-row seat, a jump seat is widely used which is provided between a pair of outer fixed second-row seats as the conventional two-row auxiliary seat structure and is foldable in the form of a single armrest to secure a passage.

The jump seat has a structure in which a seat back is completely folded on a seat cushion around a recliner, and then both of the folded seat back and the seat cushion are pushed aside in a direction of the outer second-row seats, thereby forming a passage for allowing a passenger to get into and out of a vehicle toward and from the third-row seat.

However, the conventional auxiliary seat structure is a structure in which the folded jump seat always occupies a predetermined portion of the passageway so that there is a problem in that, when the passenger gets into and out of the vehicle toward and from the third-row seat, a passage space is small to cause inconvenience to the passenger.

In order to solve the problem, there has been proposed a double folding structure in which a seat cushion of an outer seat is installed to be openable and closable and an auxiliary seat is side folded at 180 degrees to be accommodated in the seat cushion by opening the seat cushion. However, the double folding structure also has a problem in that the auxiliary seat cannot be drawn out or accommodated in a state in which a passenger is sitting on the outer seat or a child seat is mounted on the outer seat.

The foregoing is intended merely to aid in the understanding of the background of the present disclosure and is not intended to mean that the present disclosure falls within the purview of the related art that is already known to those skilled in the art.

SUMMARY

Accordingly, the present disclosure proposes an auxiliary seat storage apparatus of a seat, which is capable of improving convenience of a user and storability by sliding and accommodating an auxiliary seat in a lower portion of a main seat in a state in which the auxiliary seat is folded.

According to one aspect, there is provided an auxiliary seat storage apparatus of a seat, including: a side rail installed below a main seat and having a variable length in a side direction; a forward-backward rail installed on the side rail and configured to be moved in the side direction below the main seat and extend in a forward-backward direction; a tray installed on the forward-backward rail and configured to be moved in the forward-backward direction; and an auxiliary seat including a cushion frame which is provided on the tray and pivotably connected to the tray via a link member, wherein a position of the auxiliary seat is varied in a vertical direction; and a back frame pivotably connected to the cushion frame via a recliner.

The link member may include a first link having a first end which is pivotably connected to a front-side portion of the tray and a second end which is pivotably connected to a rear-side portion of the cushion frame; and a second link having a first end which is pivotably connected to the forward-backward rail and a second end which is connected to the first link and configured to support a pivot position of the first link.

A slit hole to which the a first end of the second link is pivotably connected may be formed in the forward-backward rail, and the slit hole may be formed to extend in the forward-backward direction.

The link member may further include a third link having a first end which is pivotably connected to a front-side portion of the cushion frame and a second end which is pivotably connected to a rear-side portion of the tray and configured to support a pivot position of the cushion frame.

The link member may further include a fourth link having a first end which is connected to the rear-side portion of the cushion frame together with the second end of the first link and a second end which is pivotably connected to the third link.

The auxiliary seat storage apparatus may further include a support device having a first end which is pivotably connected to the front-side portion of the tray and a second end which is connected to the third link and configured to provide an elastic force for supporting the cushion frame.

The support device may be connected to an operation cable, which provides an operating force by being interlocked with an operation lever installed on the back frame, and when the operation lever is manipulated, the support device may be driven by receiving the operating force through the operation cable.

The operation cable extending from the operation lever may be connected to the recliner, and when the operation lever is manipulated, the recliner performs a locking release operation by receiving the operating force through the operation cable.

The auxiliary seat storage apparatus may further include a forward-backward locking mechanism having a plurality of fixing grooves formed in the forward-backward rail in the forward-backward direction, installed on the tray to be pivoted in the vertical direction, and selectively inserted into the plurality of fixing grooves to limit movement of the tray in the forward-backward direction.

The forward-backward locking mechanism may include a locking lever pivotably installed on the tray to perform seesaw motion and having a first end connected to a lock cable; and a locking block having a fixing protrusion connected to a second end of the locking lever and moved in the vertical direction, when the locking lever is pivoted, to be inserted into the plurality of fixing grooves.

A guide bracket may be formed to be open on the tray in the vertical direction to guide the locking block to be moved in the vertical direction.

An insertion hole, to which a second end of the locking lever is hingedly connected, may be formed to extend in an upper end portion of the locking block in the forward-backward direction, and the fixing protrusion may be formed to protrude downward from a lower end portion of the locking block.

The lock cable may be connected to be interlocked with pivoting of the back frame or the recliner, and when the back frame is folded, a pulling force may be applied to the lock cable to pivot the locking lever.

The side rail may include a plurality of sliding rails and slide in a length direction in a state in which the plurality of sliding rails are superposed to vary lengths of the plurality of sliding rails.

The side rail may include a first sliding rail fixed to the lower portion of the main seat and extending in the side direction; a second sliding rail provided on the first sliding rail and configured to be moved along the first sliding rail; and a third sliding rail provided on the second sliding rail, configured to be moved along the second sliding rail, and fixed to the forward-backward rail.

The auxiliary seat storage apparatus may further include a side locking mechanism installed at a side of the forward-backward rail on an uppermost sliding rail among the plurality of sliding rails and configured to selectively allow variable length operations of the plurality of sliding rails by being interlocked with the tray which is moved along the forward-backward rail.

The side locking mechanism may include a locking bracket installed at the side of the forward-backward rail on the uppermost sliding rail among the plurality of sliding rails and configured to perform seesaw motion in the vertical direction; and a locking pin connected to the locking bracket and configured to be vertically moved, when the locking bracket performs the seesaw motion, to limit movements of the plurality of sliding rails.

Through-holes, which match each other, may be formed in the plurality of sliding rails so as to allow the locking pin to pass through the plurality of sliding rails in a state in which the auxiliary seat is drawn out from the lower portion of the main seat and then unfolded.

A contact block may be provided on the tray to make the locking bracket perform the seesaw motion by being brought into contact with the locking bracket of the side locking mechanism when the tray is moved forward along the forward-backward rail.

A locking plate may be formed in an end portion of the tray in a direction in which the tray is inserted into the lower portion of the main seat, a position fixing pin may be formed to protrude from the locking plate in the side direction, a facing plate may be provided on the main seat to match the locking plate in a state in which the tray is inserted into the lower portion of the main seat, and a locking knob may be provided on the facing plate to surround and fix the position fixing pin when the position fixing pin is inserted into the facing plate.

The locking knob may be spring supported downward from the facing plate, and a locking groove, into which the locking knob is inserted when the locking knob is inserted into the facing plate, may be formed in the position fixing pin.

A roller in contact with a bottom surface may be provided at a lower portion of the tray.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinafter, an auxiliary seat storage apparatus of a seat according to exemplary embodiments of the present disclosure will be described with reference to the accompanying drawings.

Figure 1:
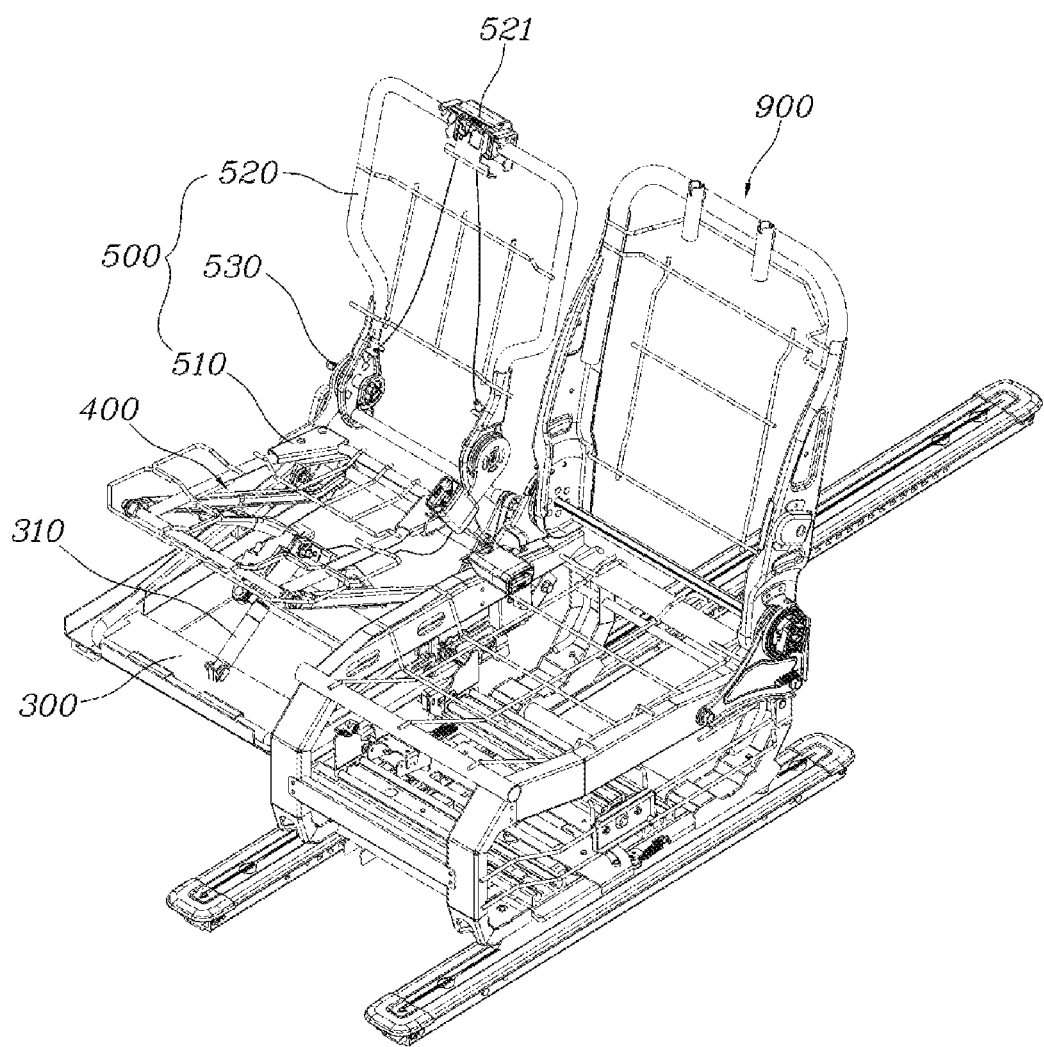
FIG. 1 is a diagram illustrating a main seat and an auxiliary seat according to the present disclosure.
Figure 2:
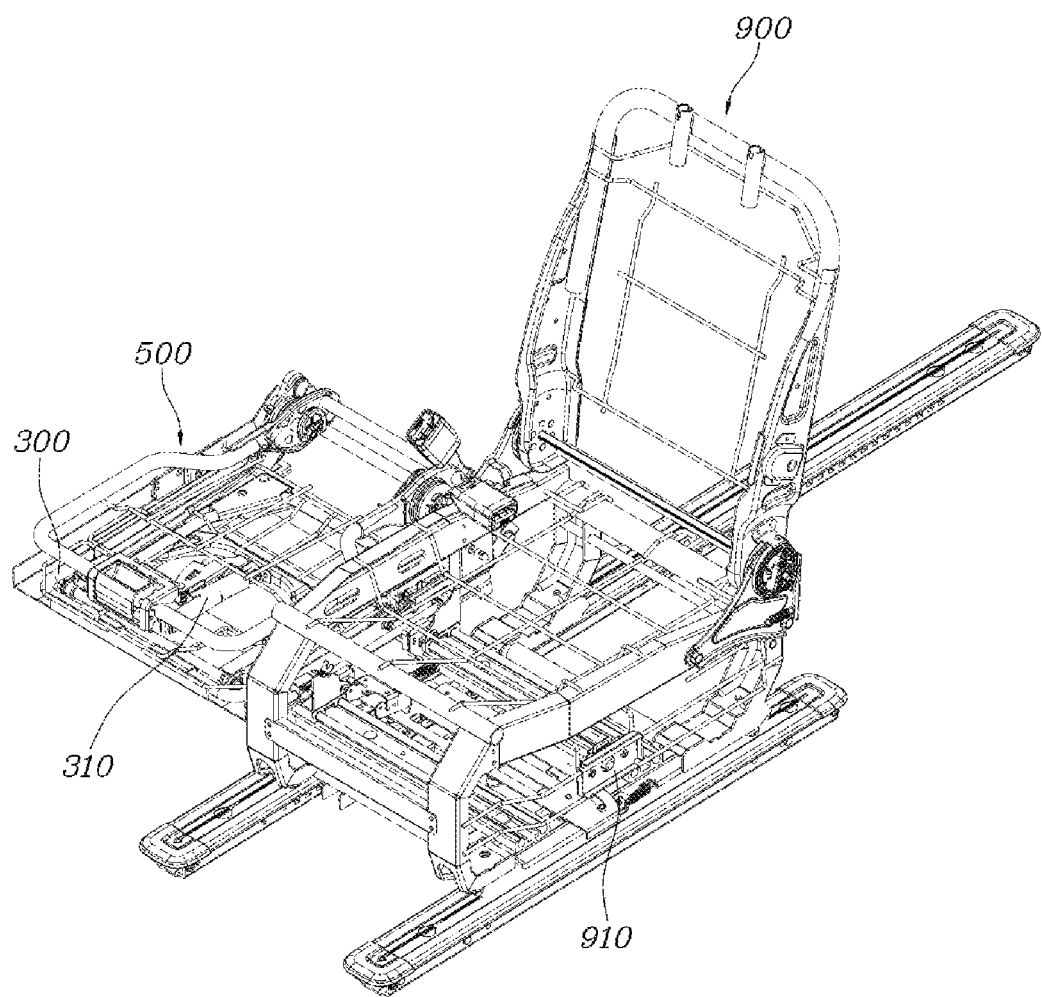
FIGS. 2 and 3 are diagrams illustrating a process in which the auxiliary seat is accommodated in the main seat.
Figure 3:
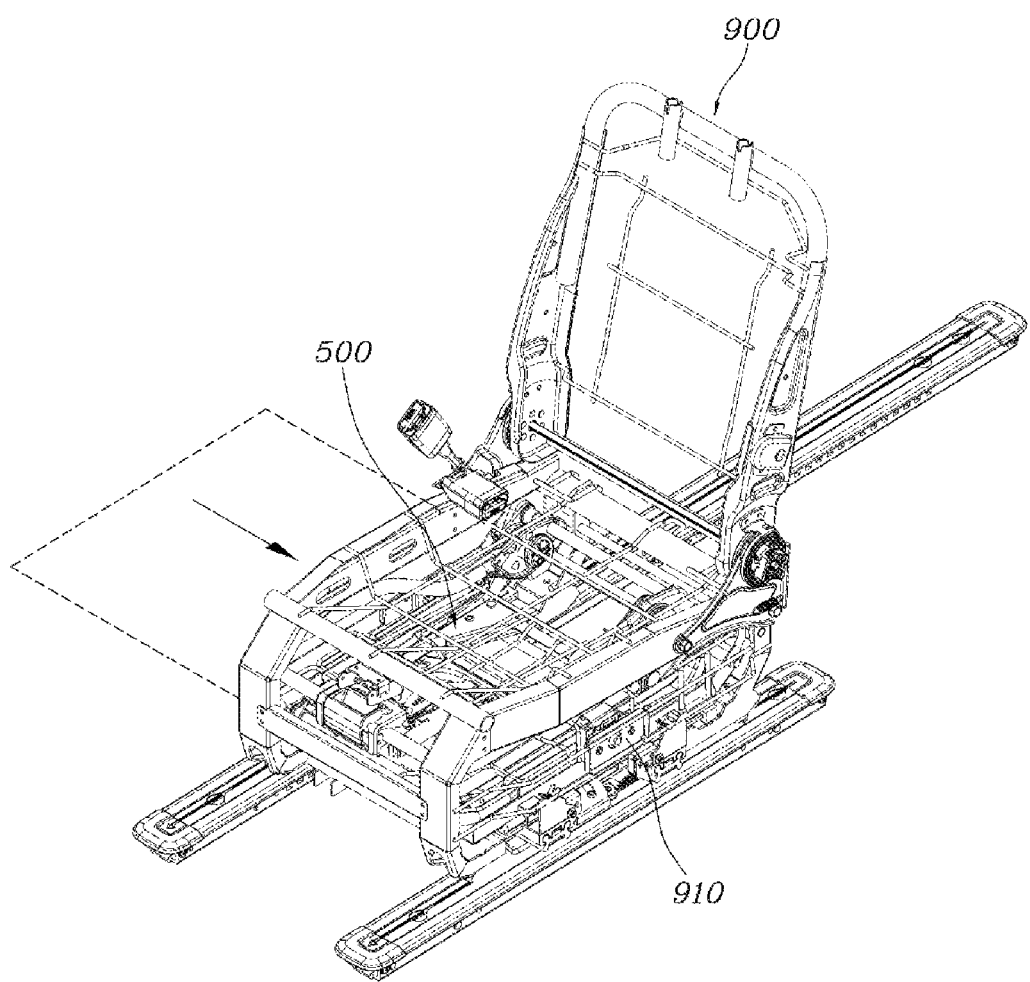
Figure 4:
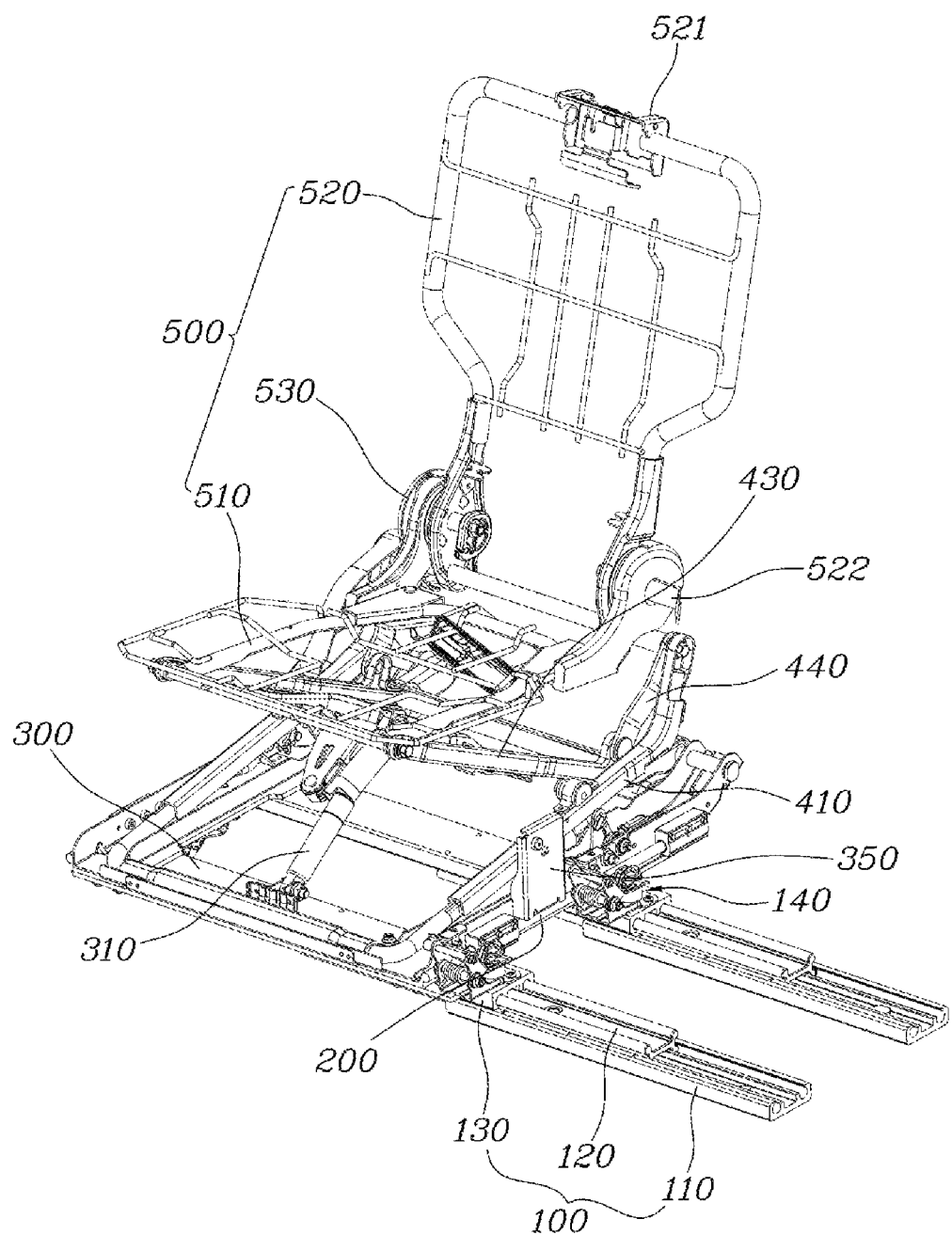
FIGS. 4 and 5 are diagrams illustrating an auxiliary seat storage apparatus of a seat according to the present disclosure.
Figure 5:
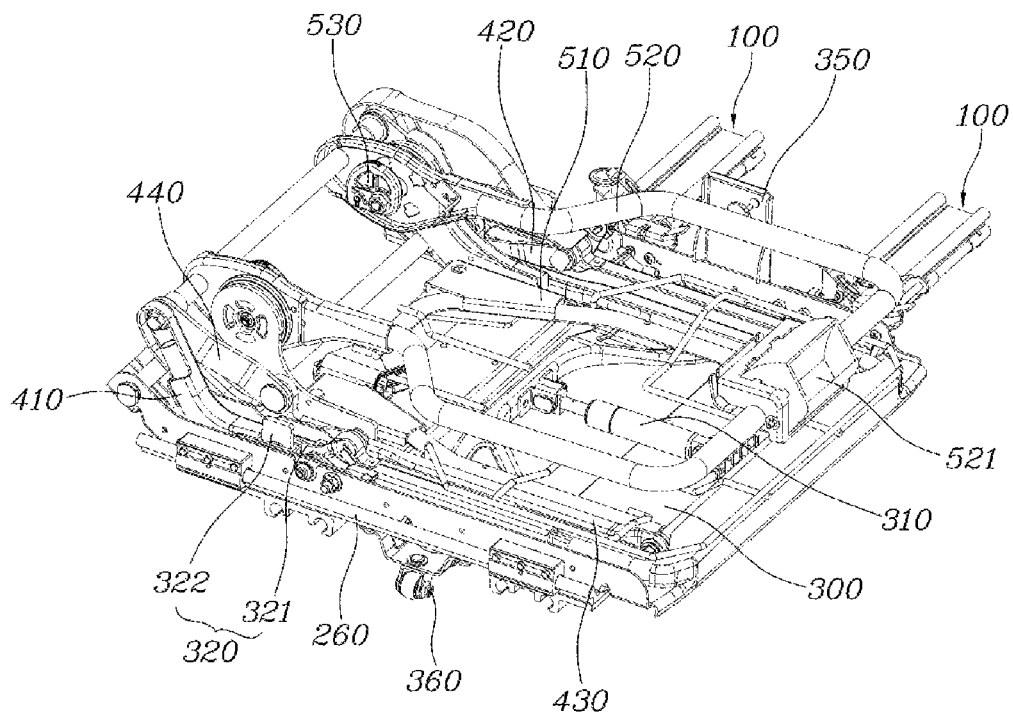
Figure 6:
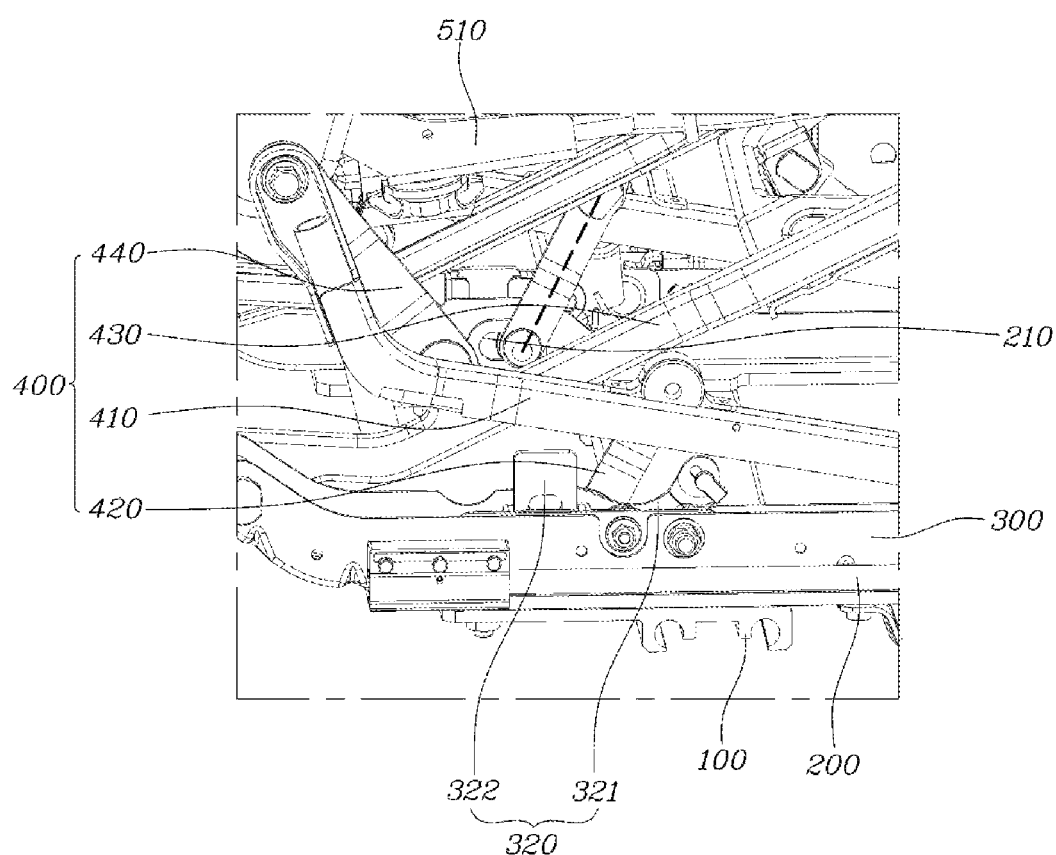
FIGS. 6 and 7 are diagrams for describing a link member of the auxiliary seat storage apparatus of a seat according to the present disclosure.
Figure 7:
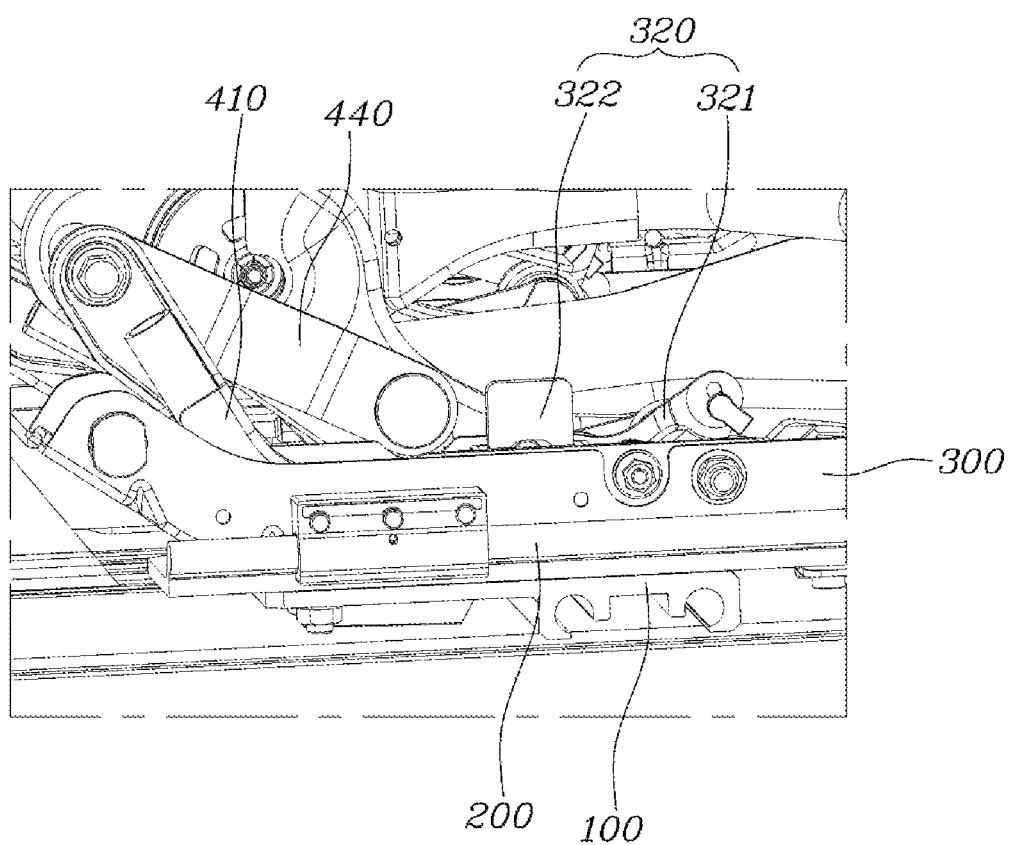
Figure 8:
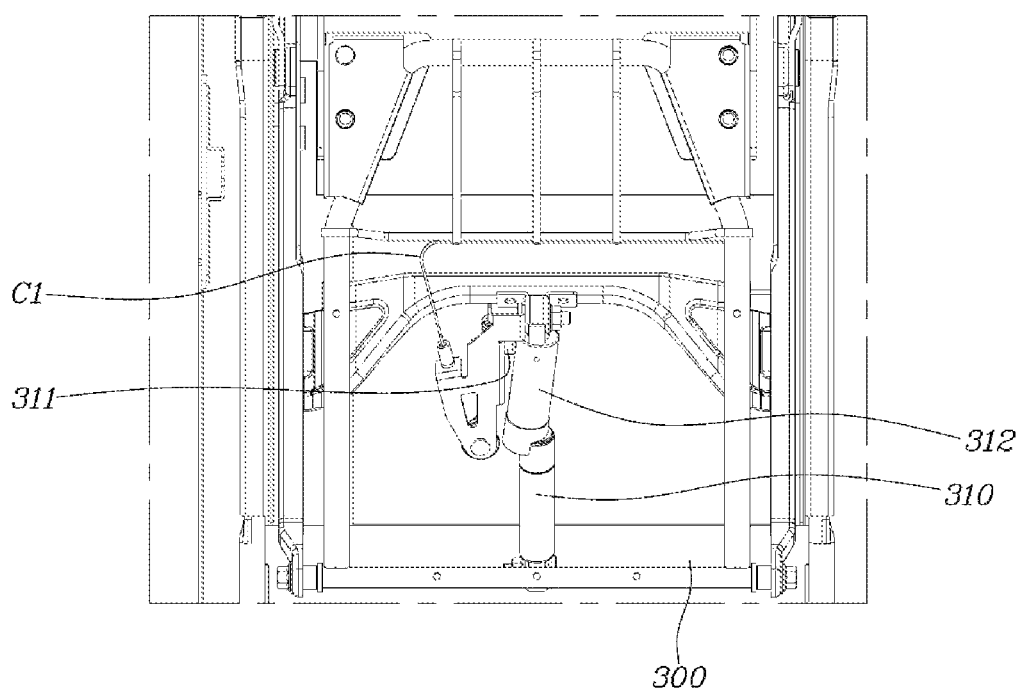
FIG. 8 is a diagram for describing a support device of the auxiliary seat storage apparatus of a seat according to the present disclosure.
Figure 9:
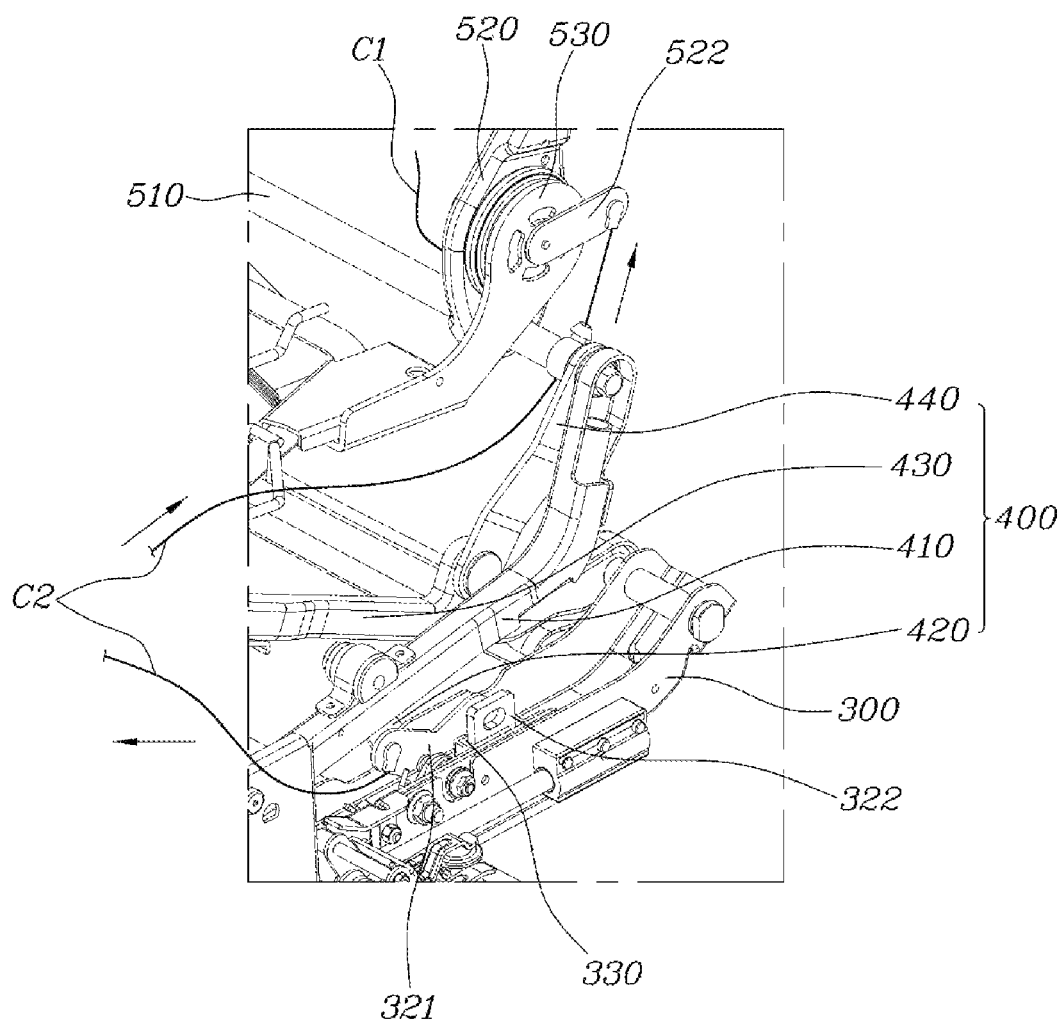
FIGS. 9 to 11 are diagrams illustrating a forward-backward locking mechanism of the auxiliary seat storage apparatus of a seat according to the present disclosure.
Figure 10:
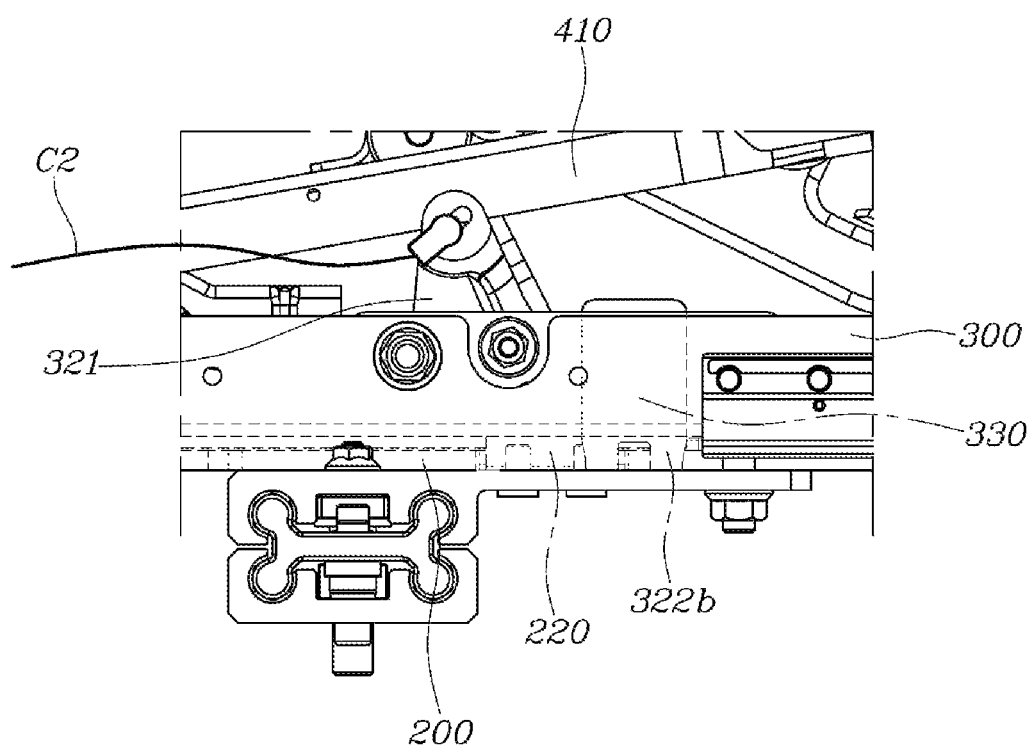
Figure 11:
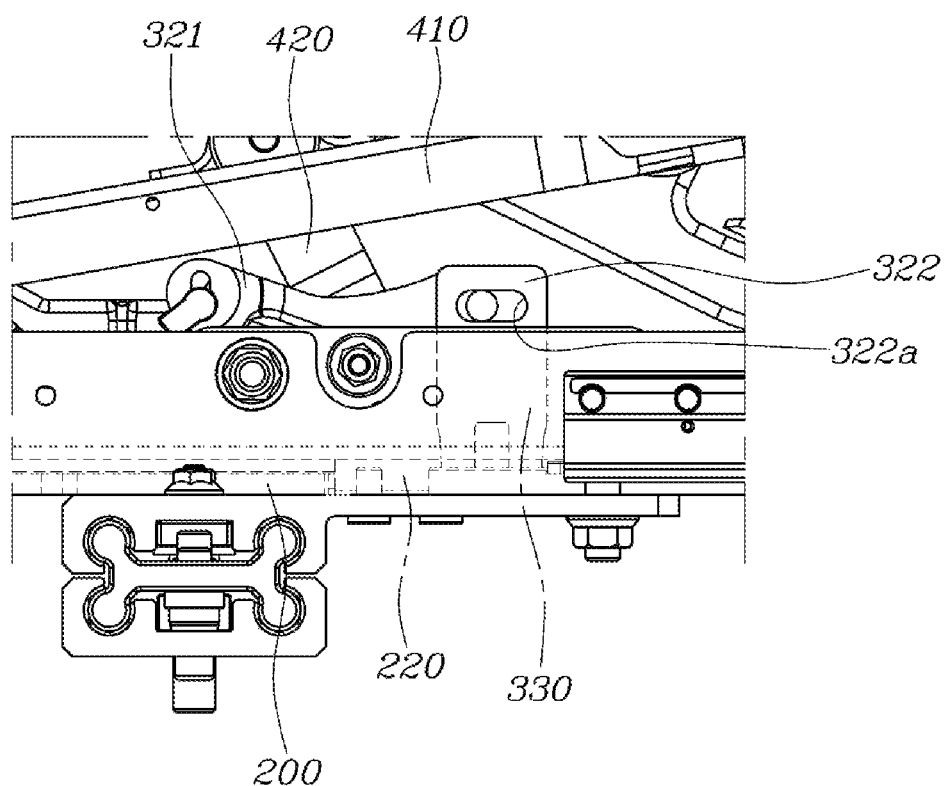
Figure 12:
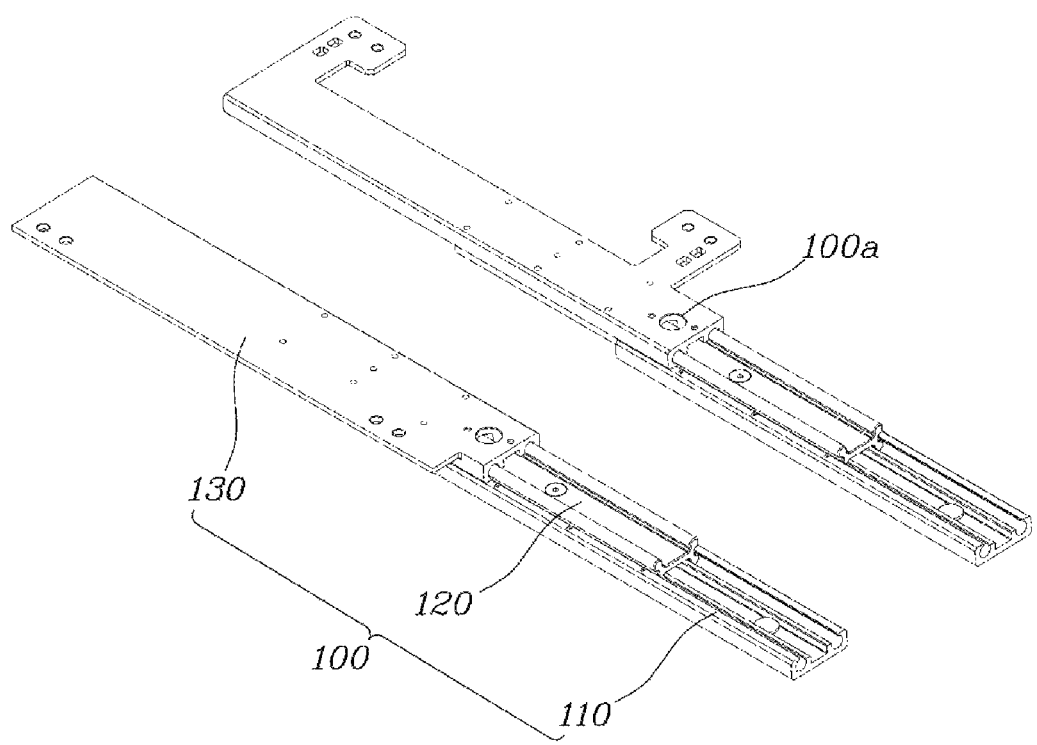
FIG. 12 is a diagram illustrating a side rail of the auxiliary seat storage apparatus of a seat according to the present disclosure.
Figure 13:
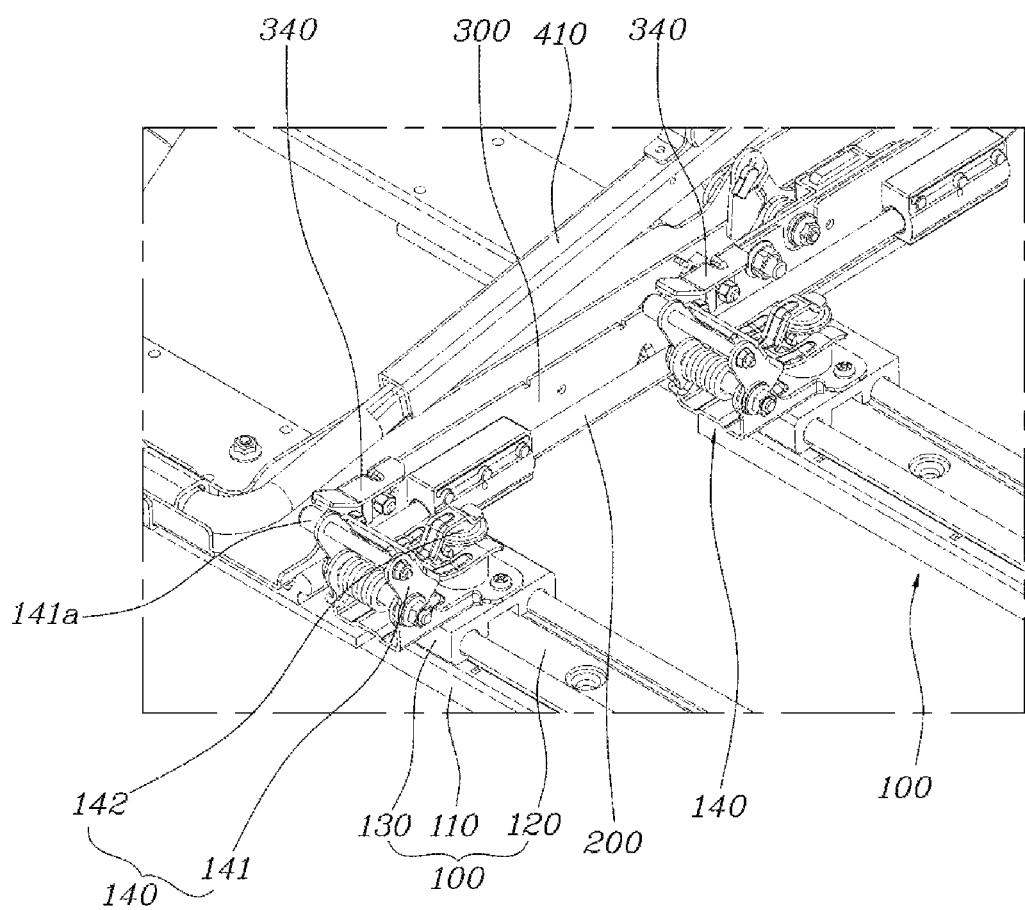
FIGS. 13 and 14 are diagrams illustrating a side locking mechanism of the auxiliary seat storage apparatus of a seat according to the present disclosure.
Figure 14:
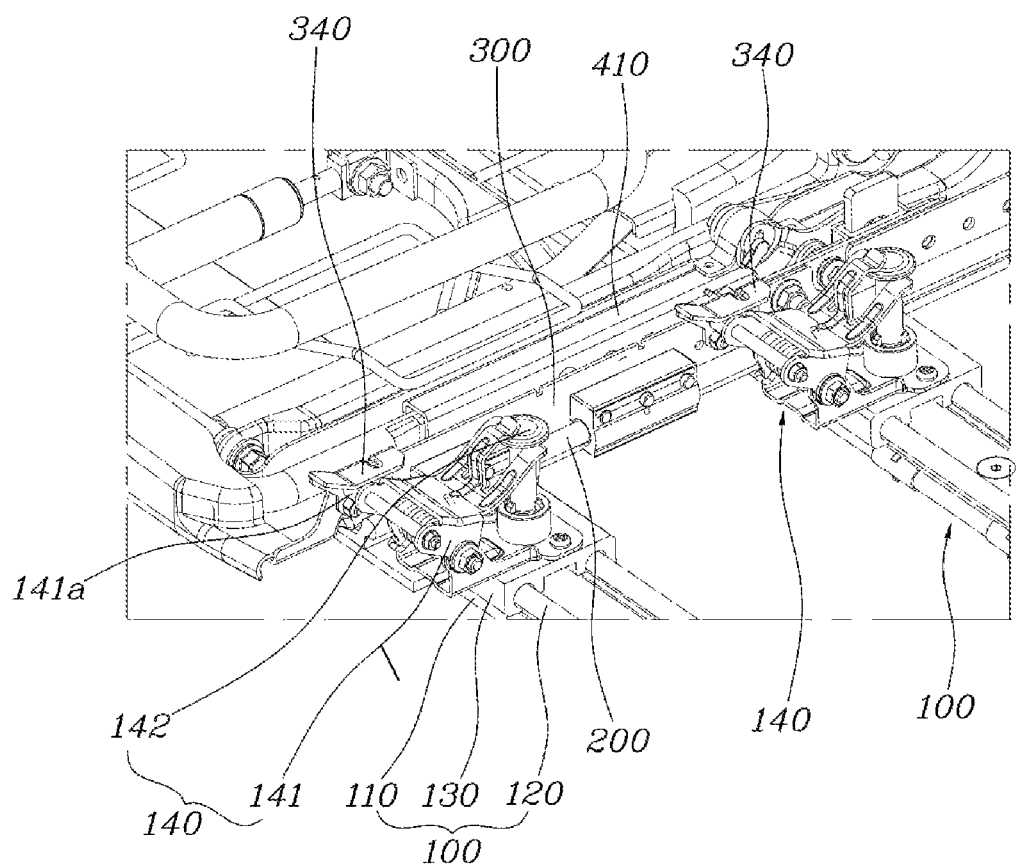
Figure 15:
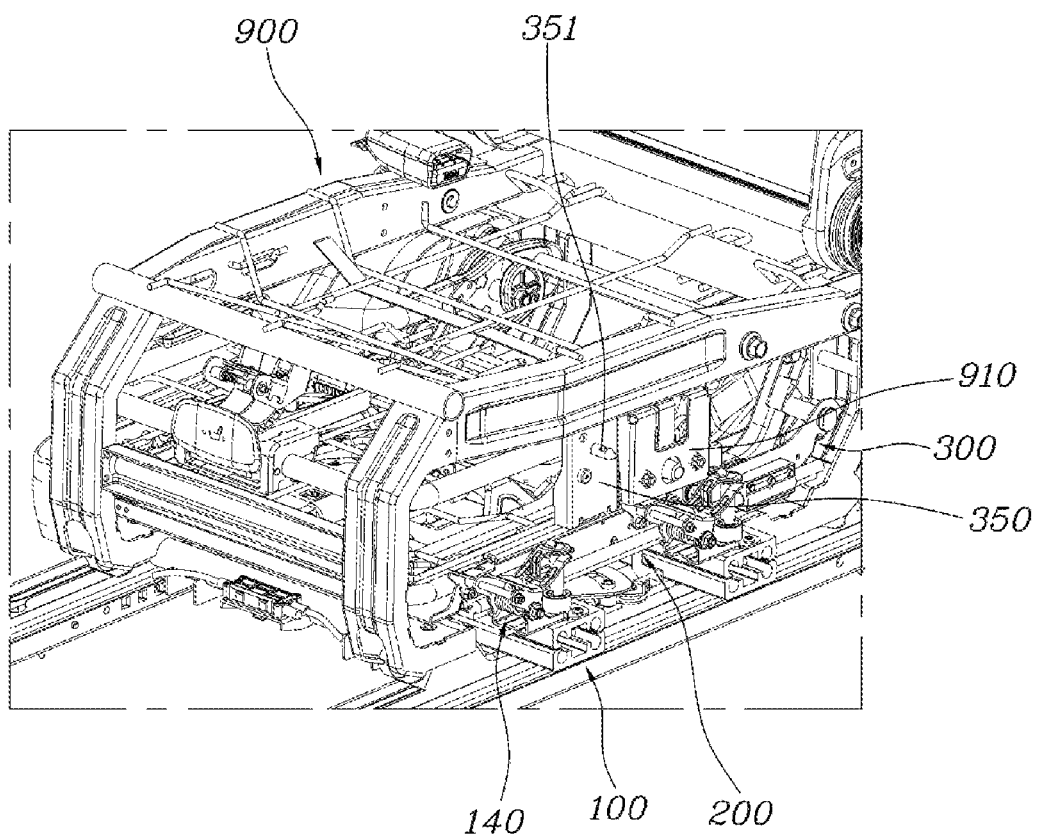
FIGS. 15 and 16 are diagrams illustrating a locking structure when the auxiliary seat is accommodated in the auxiliary seat storage apparatus of a seat of the present disclosure.
Figure 16:
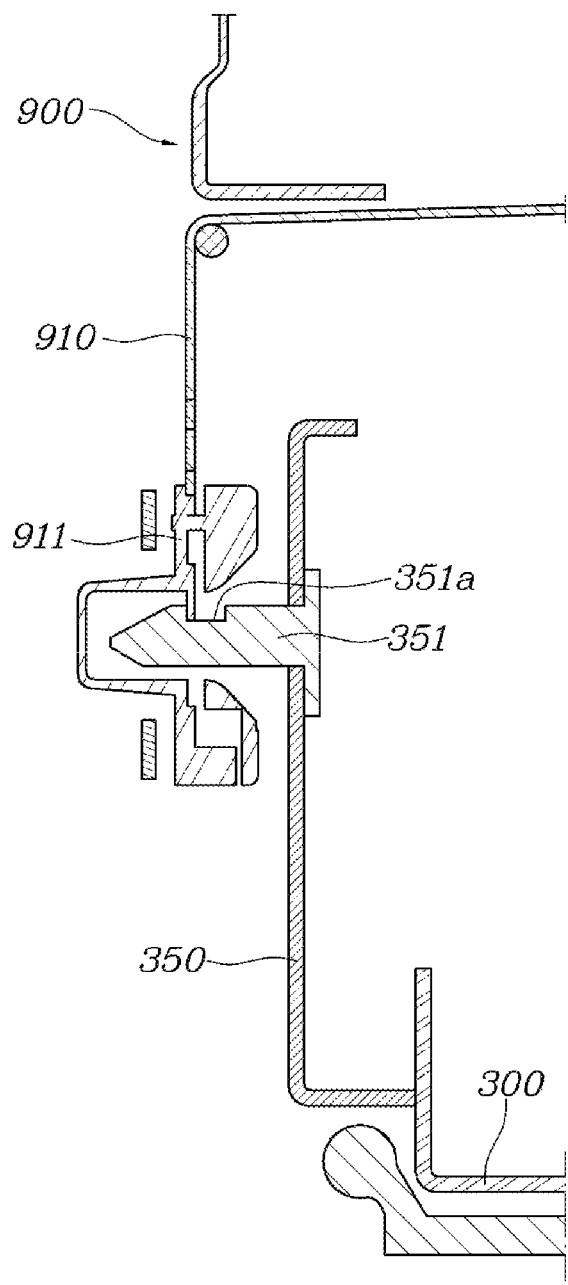

FIG. 1 is a diagram illustrating a main seat and an auxiliary seat according to the present disclosure, FIGS. 2 and 3 are diagrams illustrating a process in which the auxiliary seat is accommodated in the main seat, FIGS. 4 and 5 are diagrams illustrating an auxiliary seat storage apparatus of a seat according to the present disclosure, FIGS. 6 and 7 are diagrams for describing a link member of the auxiliary seat storage apparatus of a seat according to the present disclosure, FIG. 8 is a diagram for describing a support device of the auxiliary seat storage apparatus of a seat according to the present disclosure, FIGS. 9 to 11 are diagrams illustrating a forward-backward locking mechanism of the auxiliary seat storage apparatus of a seat according to the present disclosure, FIG. 12 is a diagram illustrating a side rail of the auxiliary seat storage apparatus of a seat according to the present disclosure, FIGS. 13 and 14 are diagrams illustrating a side locking mechanism of the auxiliary seat storage apparatus of a seat according to the present disclosure, and FIGS. 15 and 16 are diagrams illustrating a locking structure when the auxiliary seat is accommodated in the auxiliary seat storage apparatus of a seat of the present disclosure.

As shown in FIGS. 1 to 4, the auxiliary seat storage apparatus of a seat according to the present disclosure includes a side rail 100 installed below a main seat 900 and configured to be varied in length in a side direction; a forward-backward rail 200 installed on the side rail 100 and configured to be moved in the side direction below the main seat 900 and extend in a forward-backward direction; a tray 300 installed on the forward-backward rail 200 and configured to be moved in the forward-backward direction; and an auxiliary seat 500 including a cushion frame 510 provided on the tray 300 and pivotably connected to the tray 300 via a link member 400 to be vertically varied in position, and a back frame 520 pivotably connected to the cushion frame 510 via a recliner 530.

As described above, the present disclosure includes the main seat 900 and the auxiliary seat 500. Owing to a configuration of the side rail 100, the forward-backward rail 200, and the tray 300 which are provided below the main seat 900, the auxiliary seat 500 is configured to be drawn out from a lower portion of the main seat 900 in the side direction. Here, the auxiliary seat 500 includes the cushion frame 510 and the back frame 520, and the back frame 520 may be pivoted to be folded at the cushion frame 510 via the recliner 530. Further, the tray 300 on which the auxiliary seat 500 is installed may be installed on the forward-backward rail 200 to slide in the forward-backward direction, and the forward-backward rail 200 may be installed on the side rail 100 to slid together with the auxiliary seat 500 and the tray 300 in the side direction. Since the auxiliary seat 500 is pivotably installed at the tray 300 via the link member 400, the cushion frame 510 ascends or descends by being interlocked with pivoting of a link member 400 such that the auxiliary seat 500 may be switched to a state in which a passenger can be seated.

In this case, to describe the accommodation of the auxiliary seat 500 according to the present disclosure, the back frame 520 is folded to the cushion frame 510 in a state in which the auxiliary seat 500 is drawn out as shown in FIG. 1, and then the auxiliary seat 500 shifts into a state of being accommodated in the lower portion of the main seat 900 as shown in FIG. 2. Here, as shown in FIG. 3, when the auxiliary seat 500 is moved forward along the forward-backward rail 200 together with the tray 300, and then the auxiliary seat 500 and the tray 300 are moved along the side rail 100 in the side direction, the auxiliary seat 500 may be inserted and accommodated in the lower portion of the main seat 900.

Accordingly, a space is secured in the side direction of the main seat 900, and the auxiliary seat 500 is accommodated in the lower portion of the main seat 900 in a state in which the auxiliary seat 500 is moved forward such that a space is secured in the lower portion of the main seat 900 to a rear side of the auxiliary seat 500. As described above, when the space is secured to the rear side of the auxiliary seat 500, feet of a passenger sitting on a rear seat of the main seat 900 are positionable in the secured space such that convenience of the passenger sitting on the rear seat is also improved.

To describe the present disclosure in detail, as shown in FIGS. 4 to 7, the link member 400 includes a first link 410 having a first end which is pivotably connected to a front-side portion of the tray 300 and a second end which is pivotably connected to a rear-side portion of the cushion frame 510; and a second link 420 having a first end which is rotatably connected to the forward-backward rail 200 and a second end which is connected to the first link 410 and configured to support a pivot position of the first link 410.

Further, the link member 400 may further include a third link 430 having a first end which is rotatably connected to a front-side portion of the cushion frame 510 and a second end which is rotatably connected to a rear-side portion of the tray 300 and configured to support a pivot position of the cushion frame 510; and a fourth link 440 having a first end which is connected to the rear-side portion of the cushion frame 510 together with a second end of the first link 410 and a second end which is pivotably connected to the third link 430.

As described above, the auxiliary seat 500 may be installed on the tray 300 via the link member 400, which is composed of the plurality of links 410 to 440, to ascend or descend. Here, each of the plurality of links 410 to 440 of the link member 40 being pivotably connected may be implemented with a hinged connection structure.

Specifically, a first end of the first link 410 may be formed in a "⊂" shape to connect a pair of bars and may be pivotably connected to the front-side portion of the tray 300, and a second end thereof may be formed to be bent with an upward inclination and to be connected to the rear-side portion of the cushion frame 510.

The second link 420 may be formed in a straight bar shape, a first end of the second link 420 is pivotably connected to a rear side of the forward-backward rail 200, and a second end thereof is pivotably connected to the second end of the first link 410. Thus, when the tray 300 is moved along the forward-backward rail 200, the second link 420 pivots the first link 410 to allow the auxiliary seat 500 to ascend or descend.

Here, as shown in FIG. 6, a slit hole 210 to which a first end of the second link 420 is pivotably connected is formed to extend in the forward-backward rail 200 in the forward-backward direction. Thus, a clearance which is generated during pivoting of the second link 420 may be absorbed, and the pivoting of the first link 410 due to the pivoting of the second link 420 may be smoothly performed.

Meanwhile, the third link 430 may be formed in an "H" shape in which a first end of the third link 430 is pivotably connected to the front-side portion of the cushion frame 510, a second end is pivotably connected to the rear-side portion of the tray 300, and a pair of bars are connected at an intermediate end of the third link 430. Here, a support device 310, which will be described below, may be connected to the intermediate end of the third link 430. The fourth link 440 is formed in a straight bar shape in which a first end of the fourth link 440 is connected to the rear-side portion of the cushion frame 510 together with a second end of the first link 410, and a second end thereof is pivotably connected to the third link 430.

Thus, when the auxiliary seat 500 ascends, the second link 420 is pivoted on the forward-backward rail 200 to pivot the first link 410. Consequently, the first link 410 supports the rear-side portion of the cushion frame 510 in the front-side portion of the tray 300, and the third link 430 and the fourth link 440 are pivoted to support the front-side portion of the cushion frame 510 in the rear-side portion of the tray 300. As described above, since the links 410 to 440 constituting the link member 400 implement a mutual support form, the auxiliary seat 500 may stably ascend or descend and support its weight and a weight of a passenger with a strong supporting force in an ascending state.

Meanwhile, as shown in FIGS. 4 and 8, the tray 300 may further include the support device 310 which has a first end rotatably connected to the front-side portion of the tray 300 and a second end connected to the third link 430 and is configured to provide an elastic force for supporting the cushion frame 510. Here, the support device 310 may be comprised of a gas spring, and various actuators may be employed as the support device 310.

The support device 310 may be connected to the third link 430 via an operating rod 312 and be pivotably connected to the tray 300. Thus, when the support device 310 provides an elastic force, the support device 310 is pivoted at the same time that the auxiliary seat 500 ascends.

That is, the support device 310 may be connected to an operation cable C1 which provides an operating force by being interlocked with an operation lever 521 installed on the back frame 520. When the operation lever 521 is manipulated, the support device 310 may be driven by receiving an operating force through the operation cable C1.

Here, the operation lever 521 is installed on the back frame 520 and driven by a manipulation of a user. When the operation lever 521 is manipulated, a pulling force is generated on the operation cable C1 so that an operating force is applied to the operation lever 521. Accordingly, for example, when the pulling force is generated on the operation cable C1 due to a manipulation of the operation lever 521, an operation pin 311 connected to the operation cable C1 is moved downward to push the operating rod 312, and the operating rod 312 is coaxial with the support device 310 to release latching of the support device 310 with the operating rod 312. Consequently, the support device 310 may be inserted into the operating rod 312.

Thus, the latching of the support device 310 is released due to only the manipulation of the user to the operation lever 521 such that the auxiliary seat 500 may ascend or descend.

Further, the operation cable C1 extending from the operation lever 521 is connected to the recliner 530, and when the operation lever 521 is manipulated, the recliner 530 may receive the operating force through the operation cable C1 such that the locking may be released. Thus, owing to only the manipulation of the user to the operation lever 521, confinement of the recliner 530 and the locking of the support device 310 may be simultaneously released, and the back frame 520 is pivoted forward such that a folding operation and an ascending or descending operation may be performed simultaneously.

Here, a configuration, in which the confinement of the recliner 530 is selectively released according to the generation of the pulling force of the operation cable C1 according to the manipulation to the operation lever 521, is a structure which is commonly used in the field of vehicle seats, and thus a detailed description thereof will be omitted.

Meanwhile, as shown in FIGS. 9 to 11, a plurality of fixing grooves 220 are formed in the forward-backward rail 200 in the forward-backward direction, and a forward-backward locking mechanism 320 may be further included which is installed to be pivoted at the tray 300 in a vertical direction and is selectively inserted into the plurality of fixing grooves 220 to limit forward-backward movement of the tray 300.

Here, the plurality of fixing grooves 220 may be formed in the forward-backward rail 200 at regular intervals in the forward-backward direction. When the forward-backward locking mechanism 320 installed at the tray 300 is selectively inserted into the plurality of fixing grooves 220 formed in the forward-backward rail 200, forward-backward movement of the tray 300 is limited. When the forward-backward locking mechanism 320 is released from the plurality of fixing grooves 220, the tray 300 is movable such that the auxiliary seat 500 may be moved forward along the forward-backward rail 200.

To describe the forward-backward locking mechanism 320 in detail, the forward-backward locking mechanism 320 includes a locking lever 321 which is pivotably installed on the tray 300 to perform seesaw motion and has a first end connected to a lock cable C2; and a locking block 322 in which a fixing protrusion 322b is formed, wherein the fixing protrusion 322b is connected to a second end of the locking lever 321 and moved in the vertical direction, when the locking lever 321 is pivoted, to be inserted into the fixing groove 220.

As described above, the forward-backward locking mechanism 320 is comprised of the locking lever 321 and the locking block 322, and the locking lever 321 is pivotably installed at the tray 300 and performs seesaw motion about a central axis. Here, the locking lever 321 may be connected to the lock cable C2 and may receive an operating force from the lock cable C2 to be pivoted. The locking block 322, which performs linear motion in the vertical direction due to pivoting of the locking lever 321, is connected to the locking lever 321. That is, when the locking block 322 is moved upward due to the pivoting of the locking lever 321, the locking block 322 is released from the fixing groove 220 to allow the tray 300 to be movable, whereas when the locking block 322 is moved downward, the locking block 322 is inserted into the fixing groove 220 to limit the movement of the tray 300.

Here, it is preferable that a guide bracket 330, which is formed to be open in the vertical direction and guides the locking block 322 to move in the vertical direction, is provided on the tray 300 to allow the locking block 322 to perform only linear movement.

Further, an insertion hole 322a, which is hingedly connected to a second end of the locking lever 321 and formed to extend in the forward-backward direction, may be formed in an upper end portion of the locking block 322, and the fixing protrusion 322b may be formed to protrude downward from a lower end portion of the locking block 322. Here, the insertion hole 322a to which a second end of the locking lever 321 is hingedly connected is formed in the upper end portion of the locking block 322, and the insertion hole 322a is formed to extend in the forward-backward direction such that a clearance due to the pivoting of the locking lever 321 may be absorbed.

Thus, the locking block 322, which is interlocked with the pivoting of the locking lever 321, may be vertically moved such that the movement of the tray 300 may be selectively allowed or limited according to whether the fixing protrusion 322b is inserted into the fixing groove 220.

Here, as shown in FIG. 9, the lock cable C2 may be connected to be interlocked with the pivoting of the back frame 520 or the recliner 530. When the back frame 520 is folded, a pulling force is applied to the lock cable C2 such that the locking lever 321 may be pivoted.

To this end, a pivoting bar 522, which is pivoted by being interlocked with the pivoting of the back frame 520, may be provided at the recliner 530. A first end of the lock cable C2 may be connected to the pivoting bar 522, and the lock cable C2 extends in a forward direction and then is bent in a backward direction so that a second end of the lock cable C2 may be connected to the locking lever 321. Accordingly, when the back frame 520 is pivoted to be folded, a pulling force is applied to the lock cable C2 by interlocking with the pivoting of the pivoting bar 522, and the locking to lever 321 connected to the lock cable C2 is pivoted due to the pulling force such that the locking block 322 may be vertically moved to be released from the fixing groove 220.

Meanwhile, as shown in FIG. 12, the side rail 100 may be comprised of a plurality of sliding rails and configured to be varied in length by sliding in a length direction in a state in which the plurality of sliding rails are superposed. That is, the side rail 100 has a form in which the plurality of sliding rails extending in a straight line are superposed such that robustness between the plurality of sliding rails may be increased, and each of the plurality of sliding rails is moved in the length direction such that a length of the side rail 100 may be varied.

Thus, the side rail 100 may include a first sliding rail 110 fixed to the lower portion of the main seat 900 and configured to extend in the side direction, a second sliding rail 120 provided on the first sliding rail 110 and configured to be moved along the first sliding rail 110, and a third sliding rail 130 which is provided on the second sliding rail 120 and configured to be moved along the second sliding rail 120 and to which the forward-backward rail 200 is fixed.

That is, the first sliding rail 110 is fixed to the lower portion of the main seat 900, and the second sliding rail 120 serves as a medium for guiding sliding operations of the first sliding rail 110 and the third sliding rail 130 therebetween. As described above, the side rail 100 has a structure in which the sliding rails 110 to 130 are provided and superposed such that robustness which is capable of supporting weights of the auxiliary seat 500 and a passenger, and the auxiliary seat 500 and the tray 300 may be moved in the side direction through the sliding operation of each of the sliding rails 110 to 130.

Meanwhile, as shown in FIGS. 13 and 14, a side locking mechanism 140 may be further included which is installed at a side of the forward-backward rail 200 on an uppermost sliding rail among the sliding rails 110 to 130 and selectively allows the sliding rails 110 to 130 to perform variable length operations by being interlocked with the tray 300 which is moved along the forward-backward rail 200.

That is, in a state in which the side locking mechanism 140 is installed on the side rail 100, the side locking mechanism 140 is locked to limit the variable length operations of the sliding rails 110 to 130. When the tray 300 is moved along the forward-backward rail 200 to operate the side locking mechanism 140, the locking of the side locking mechanism 140 is released such that the tray 300 is moved along the side rail 100 in the side direction.

Specifically, the side locking mechanism 140 may include a locking bracket 141 installed at a side of the forward-backward rail 200 on the uppermost sliding rail among the sliding rails 110 to 130 and configured to perform seesaw motion in the vertical direction; and a locking pin 142 connected to the locking bracket 141 and configured to be moved in the vertical direction, when the locking bracket 141 performs the seesaw motion, to limit movements of the sliding rails 110 to 130.

As described above, the side locking mechanism 140 is comprised of the locking bracket 141 and the locking pin 142. The locking bracket 141 may be installed at the side of the forward-backward rail 200 on the sliding rail and operated by being brought into contact with the tray 300 which is moved along the forward-backward rail 200. Further, the locking bracket 141 is installed to perform seesaw motion in the vertical direction and is elastically restored through a spring. The locking pin 142 is provided to be vertically moved during the seesaw motion of the locking bracket 141. Here, when the locking pin 142 is vertically moved downward to pass through the sliding rails 110 to 130, the locking pin 142 limits the variable length operations of the sliding rails 110 to 130, and when the locking pin 142 is vertically moved upward, the locking pin 142 is released from the sliding rails 110 to 130 to allow the variable length operations of the sliding rails 110 to 130.

To this end, through-holes 100a matching each other may be formed in the sliding rails 110 to 130 to allow the locking pin 142 to pass through the through-holes 100a in a state in which the sliding rails 110 to 130 are unfolded to allow the auxiliary seat 500 to be drawn out from the lower portion of the main seat 900. Thus, in a state in which the sliding rails 110 to 130 are unfolded so as to increase the length of the side rail 100, the through-holes 100a match on the sliding rails 110 to 130 in the vertical direction. Consequently, when the locking pin 142 is inserted into the through-holes 100a formed in the sliding rails 110 to 130, the variable length operations of the sliding rails 110 to 130 may be limited.

Further, a contact block 340 may be provided on the tray 300 to make the locking bracket 141 perform seesaw motion by being brought into contact with the locking bracket 141 of the side locking mechanism 140 when the tray 300 is moved forward along the forward-backward rail 200.

As described above, the contact block 340 may be formed on the tray 300 to be brought into contact with the locking bracket 141 when the tray 300 is moved forward, and a hook pin 141a may be provided on the locking bracket 141 to be hooked to the contact block 340. Thus, in order to accommodate the auxiliary seat 500, when the back frame 520 is folded and then the tray 300 is pushed together with the auxiliary seat 500 in the forward direction of the forward-backward rail 200, the contact block 340 of the tray 300 pushes the hook pin 141a of the locking bracket 141 to pivot the locking bracket 141. Accordingly, the locking pin 142 is vertically moved by being interlocked with the pivoting of the locking bracket 141 to be released from the through-holes 100a formed in the sliding rails 110 to 130. Consequently, the variable length operations of the sliding rails 110 to 130 are allowed such that the auxiliary seat 500 and the tray 300 may be inserted and accommodated in the lower portion of the main seat 900 due to length retraction operations of the sliding rails 110 to 130.

Meanwhile, as shown in FIGS. 15 and 16, a locking plate 350 may be formed on an end portion of the tray 300 in a direction in which the tray 300 is inserted into the lower portion of the main seat 900, a position fixing pin 351 may be formed to protrude from the locking plate 350 in the side direction, a facing plate 910 may be provided on the main seat 900 to match the locking plate 350 in a state in which the tray 300 is inserted into the lower portion of the main seat 900, and a locking knob 911 may be provided on the facing plate 910 to surround and fix the position fixing pin 351 when the position fixing pin 351 is inserted into the locking knob 911.

When the tray 300 together with the auxiliary seat 500 is inserted and accommodated in the lower portion of the main seat 900, a position of the tray 300 is fixed in the lower portion of the main seat 900. Also, when the tray 300 is inserted into the lower portion of the main seat 900, the position fixing pin 351 which is formed on the locking plate 350 of the tray 300 is hooked to the locking knob 911 provided on the facing plate 910 of the main seat 900 such that the position of the tray 300 is fixed.

To this end, the locking knob 911 may be spring supported downward from the facing plate 910, and a locking groove 351a, into which the locking knob 911 is inserted when the locking groove 351a is inserted into the facing plate 910, may be formed in the position fixing pin 351.

Here, the locking knob 911 may be moved downward due to its own weight. However, in order for a smooth operational relationship, the locking knob 911 may be spring supported downward using a separate spring. Further, the locking groove 351a is formed in the position fixing pin 351, and a lower portion of the locking knob 911 is formed to be inserted into the locking groove 351a such that, when the position fixing pin 351 is inserted into the facing plate 910, the locking knob 911 is hooked and connected to the position fixing pin 351 and thus the position of the tray 300 may be fixed.

Meanwhile, a roller in contact with a bottom surface may be provided at a lower portion of the tray 300 to support a weight of the tray 300 and, simultaneously, allow movement of the tray 300 in the side direction to be performed smoothly.

An operation of the above-described auxiliary seat storage apparatus of a seat according to the present disclosure will be described below.

FIG. 1 depicts a state in which the auxiliary seat 500 is drawn out from the main seat 900 and the back frame 520 of the auxiliary seat 500 is unfolded from the cushion frame 510. In this case, the link member 400 is unfolded to form a support structure, and a supporting force of the auxiliary seat 500 is secured by receiving an elastic force of the support device 310.

In this state, when the auxiliary seat 500 needs to be accommodated, the operation lever 521 is manipulated to simultaneously release the confinement of the recliner 530 and the locking of the support device 310. Accordingly, the back frame 520 may be folded on the cushion frame 510, and the elastic force of the support device 310 is released such that the auxiliary seat 500 may descend to the tray 300.

In this case, when the back frame 520 is folded, and simultaneously, the auxiliary seat 500 descends as shown in FIG. 2, the back frame 520 is pivoted so that a pulling force is generated on the lock cable C2 to pivot the locking lever 321 as shown in FIGS. 9 to 10, and the locking block 322 is pivoted so that the locking block 322 is moved upward to be released from the fixing groove 220 of the forward-backward rail 200 as shown in FIG. 11. Consequently, the tray 300 is switched to a state of being movable along the forward-backward rail 200 in the forward-backward direction.

Simultaneously, as shown in FIGS. 6 and 7, the first link 410 and the second link 420 of the link member 400 are pivoted such that the auxiliary seat 500 may descend. In this case, owing to forward movement of the first link 410 resulting from the second link 420 being pivoted forward, the auxiliary seat 500 is moved forward. Thus, in a state in which the auxiliary seat 500 is accommodated in the lower portion of the main seat 900, a space is secured to a rear side of the auxiliary seat 500 to secure a space in which feet of a passenger sitting on a rear seat are positionable.

Further, as shown in FIGS. 14 and 15, when the tray 300 is moved forward together with the auxiliary seat 500, the contact block 340 provided on the tray 300 pushes to pivot the locking bracket 141 of the side locking mechanism 140. Consequently, the locking pin 142 connected to the locking bracket 141 is moved upward to be released from the through-holes 100a formed in the sliding rails 110 to 130 such that a variable length operation of the side rail 100 may be performed.

As described above, owing to only an operation in which the operation lever 521 is manipulated to fold the back frame 520 of the auxiliary seat 500 on the cushion frame 510, all of a locking release operation for the forward movement of the tray 300, an operation in which the auxiliary seat 500 descends and, simultaneously, is moved forward, and a locking release operation for side movement of the auxiliary seat 500 by being interlocked with the forward movement of the tray 300 may be performed.

As described above, when the auxiliary seat 500 shifts into a state of being accommodated in the lower portion of the main seat 900, the auxiliary seat 500 is moved to the main seat 900 so that the auxiliary seat 500 and the tray 300 are moved to the lower portion of the main seat 900 due to the variable length operation of the side rail 100.

Here, when the auxiliary seat 500 is completely accommodated in the lower portion of the main seat 900, the position fixing pin 351 which is formed on the locking plate 350 of the tray 300 is hooked to the locking knob 911 provided on the facing plate 910 of the main seat 900 so that the position of the tray 300 is fixed.

Meanwhile, a withdrawal operation of the auxiliary seat 500 may be completed in the reverse order of the above-described accommodation operation of the auxiliary seat 500 by releasing the locking through a manipulation of the locking knob 911 to unfold the back frame 520 from the cushion frame 510.

In an auxiliary seat storage apparatus of a seat having the above-described structure, an auxiliary seat slides in a lower portion of a main seat in a state of being folded and is accommodated in the lower portion of the main seat such that convenience of a user and storability can be improved. Further, when the auxiliary seat is accommodated in the lower portion of the main seat, the auxiliary seat is moved forward so that a foot insertion space is secured to a rear side of the auxiliary seat in a state in which the auxiliary seat is accommodated in the lower portion of the main seat such that ease of access of a passenger sitting on a rear seat can be improved.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An auxiliary seat storage apparatus of a seat, comprising:
   a side rail installed below a main seat and having a variable length in a side direction;
   a forward-backward rail installed on the side rail and configured to be moved in the side direction below the main seat and extend in a forward-backward direction;
   a tray installed on the forward-backward rail and configured to be moved in the forward-backward direction; and
   an auxiliary seat including a cushion frame which is provided on the tray and pivotably connected to the tray via a link member, wherein a position of the auxiliary seat is varied in a vertical direction; and
   a back frame pivotably connected to the cushion frame via a recliner.

2. The auxiliary seat storage apparatus of claim 1, wherein the link member includes:
   a first link having a first end which is pivotably connected to a front-side portion of the tray and a second end which is pivotably connected to a rear-side portion of the cushion frame; and a second link having a first end which is pivotably connected to the forward-backward rail and a second end which is connected to the first link and configured to support a pivot position of the first link.

3. The auxiliary seat storage apparatus of claim 2, wherein:
a slit hole is formed in the forward-backward rail and the first end of the second link is pivotably connected to the slit hole; and
the slit hole is formed to extend in the forward-backward direction.

4. The auxiliary seat storage apparatus of claim 2, wherein the link member further includes a third link having a first end which is pivotably connected to a front-side portion of the cushion frame and a second end which is pivotably connected to a rear-side portion of the tray and configured to support a pivot position of the cushion frame, and a fourth link having a first end which is connected to the rear-side portion of the cushion frame together with the second end of the first link and a second end which is pivotably connected to the third link.

5. The auxiliary seat storage apparatus of claim 4, further comprising:
a support device having a first end which is pivotably connected to the front-side portion of the tray and a second end which is connected to the third link and configured to provide an elastic force for supporting the cushion frame.

6. The auxiliary seat storage apparatus of claim 5, wherein the support device is connected to an operation cable, which provides an operating force by being interlocked with an operation lever installed on the back frame, and when the operation lever is manipulated, the support device is driven by receiving the operating force through the operation cable.

7. The auxiliary seat storage apparatus of claim 1, wherein an operation cable extending from an operation lever is connected to the recliner, and when the operation lever is manipulated, the recliner performs a locking release operation by receiving an operating force through the operation cable.

8. The auxiliary seat storage apparatus of claim 1, further comprising:
a forward-backward locking mechanism having a plurality of fixing grooves formed in the forward-backward rail in the forward-backward direction, installed on the tray to be pivoted in the vertical direction, and selectively inserted into the plurality of fixing grooves to limit movement of the tray in the forward-backward direction.

9. The auxiliary seat storage apparatus of claim 8, wherein the forward-backward locking mechanism includes:
a locking lever pivotably installed on the tray to perform seesaw motion and having a first end connected to a lock cable; and
a locking block having a fixing protrusion connected to a second end of the locking lever and configured to be moved in the vertical direction, when the locking lever is pivoted, to be inserted into the plurality of fixing grooves.

10. The auxiliary seat storage apparatus of claim 9, wherein a guide bracket is formed to be open on the tray in the vertical direction to guide the locking block to be moved in the vertical direction.

11. The auxiliary seat storage apparatus of claim 9, wherein:
an insertion hole, to which the second end of the locking lever is hingedly connected, is formed to extend in an upper end portion of the locking block in the forward-backward direction; and
the fixing protrusion is formed to protrude downward from a lower end portion of the locking block.

12. The auxiliary seat storage apparatus of claim 9, wherein the lock cable is connected to be interlocked with pivoting of the back frame or the recliner, and when the back frame is folded, a pulling force is applied to the lock cable to pivot the locking lever.

13. The auxiliary seat storage apparatus of claim 1, wherein the side rail includes a plurality of sliding rails and slides in a length direction in a state in which the plurality of sliding rails are superposed to vary lengths of the plurality of sliding rails.

14. The auxiliary seat storage apparatus of claim 13, wherein the side rail includes a first sliding rail fixed to the lower portion of the main seat and extending in the side direction; a second sliding rail provided on the first sliding rail and configured to be moved along the first sliding rail; and a third sliding rail provided on the second sliding rail, configured to be moved along the second sliding rail, and fixed to the forward-backward rail.

15. The auxiliary seat storage apparatus of claim 13, further comprising:
a side locking mechanism installed at a side of the forward-backward rail on an uppermost sliding rail among the plurality of sliding rails and configured to selectively allow variable length operations of the plurality of sliding rails by being interlocked with the tray which is moved along the forward-backward rail.

16. The auxiliary seat storage apparatus of claim 15, wherein the side locking mechanism includes:
a locking bracket installed at the side of the forward-backward rail on the uppermost sliding rail among the plurality of sliding rails and configured to perform seesaw motion in the vertical direction; and
a locking pin connected to the locking bracket and configured to be vertically moved, when the locking bracket performs the seesaw motion, to limit movements of the plurality of sliding rails.

17. The auxiliary seat storage apparatus of claim 16, wherein through-holes, which match each other, are formed in the plurality of sliding rails so as to allow the locking pin to pass through the plurality of sliding rails in a state in which the auxiliary seat is drawn out from the lower portion of the main seat and then unfolded, and wherein a contact block is provided on the tray to make the locking bracket perform the seesaw motion by being brought into contact with the locking bracket of the side locking mechanism when the tray is moved forward along the forward-backward rail.

18. The auxiliary seat storage apparatus of claim 1, wherein:
a locking plate is formed in an end portion of the tray in a direction in which the tray is inserted into the lower portion of the main seat, and a position fixing pin is formed to protrude from the locking plate in the side direction; and
a facing plate is provided on the main seat to match the locking plate in a state in which the tray is inserted into the lower portion of the main seat, and a locking knob is provided on the facing plate to surround and fix the position fixing pin when the position fixing pin is inserted into the facing plate.

19. The auxiliary seat storage apparatus of claim 18, wherein:
   the locking knob is spring supported downward from the facing plate; and
   a locking groove, into which the locking knob is inserted when the locking knob is inserted into the facing plate, is formed in the position fixing pin.

20. The auxiliary seat storage apparatus of claim 1, wherein a roller in contact with a bottom surface is provided at a lower portion of the tray.

* * * * *